United States Patent [19]

Ikemori et al.

[11] Patent Number: 4,466,707

[45] Date of Patent: Aug. 21, 1984

[54] VARIABLE MAGNIFICATION LENS SYSTEM

[75] Inventors: Keiji Ikemori, Kanagawa; Kazuo Tanaka, Tokyo, both of Japan

[73] Assignee: Canon Kabushiki Kaisha, Japan

[21] Appl. No.: 244,780

[22] Filed: Mar. 17, 1981

[30] Foreign Application Priority Data

Mar. 21, 1980 [JP] Japan ................................. 55-35957
Apr. 11, 1980 [JP] Japan ................................. 55-47671

[51] Int. Cl.³ ............................................. G02B 15/02
[52] U.S. Cl. .................................................. 350/422
[58] Field of Search ................. 350/38, 422, 423, 427, 350/559

[56] References Cited

U.S. PATENT DOCUMENTS 3,363,964  1/1968  Macher ............................... 350/422
4,146,305  3/1979  Tanaka ............................... 350/422

Primary Examiner—John K. Corsin
Assistant Examiner—Scott J. Sugarman
Attorney, Agent, or Firm—Toren, McGeady and Stanger

[57] ABSTRACT

A compact variable magnification objective lens system with interchangeable lens components comprising, from front to rear, a first lens component of positive power, a second lens component of negative power and a third lens component of positive power. The focal length of the entire system can be changed by interchanging the second lens component by another lens component having a different refractive power from that of the second lens component and by shifting the first lens component simultaneously.

8 Claims, 41 Drawing Figures

FIG.2A1  FIG.2A2  FIG.2A3
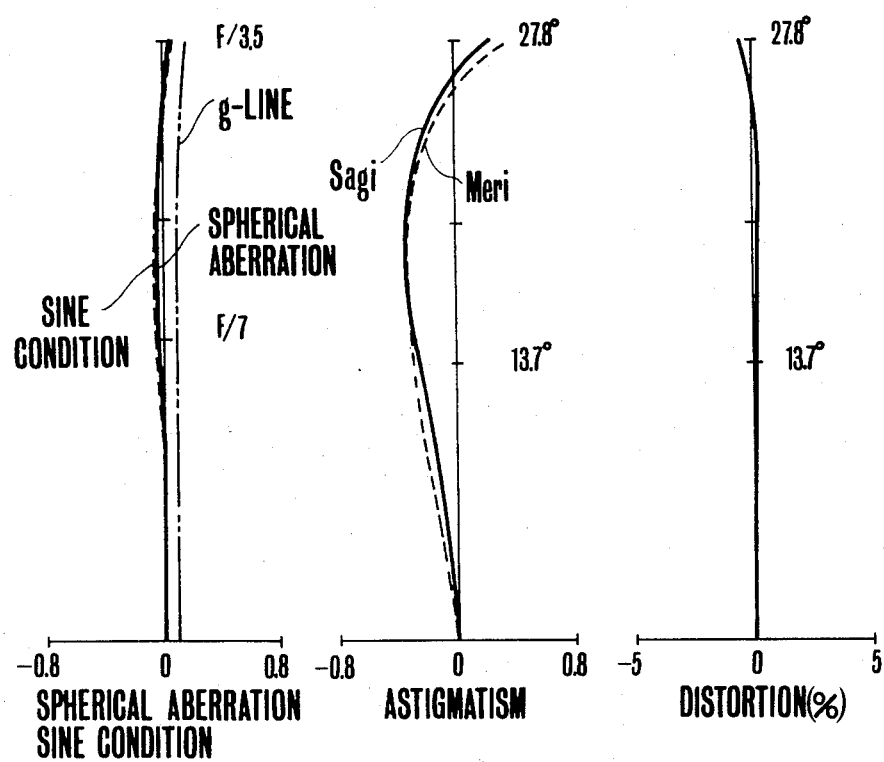

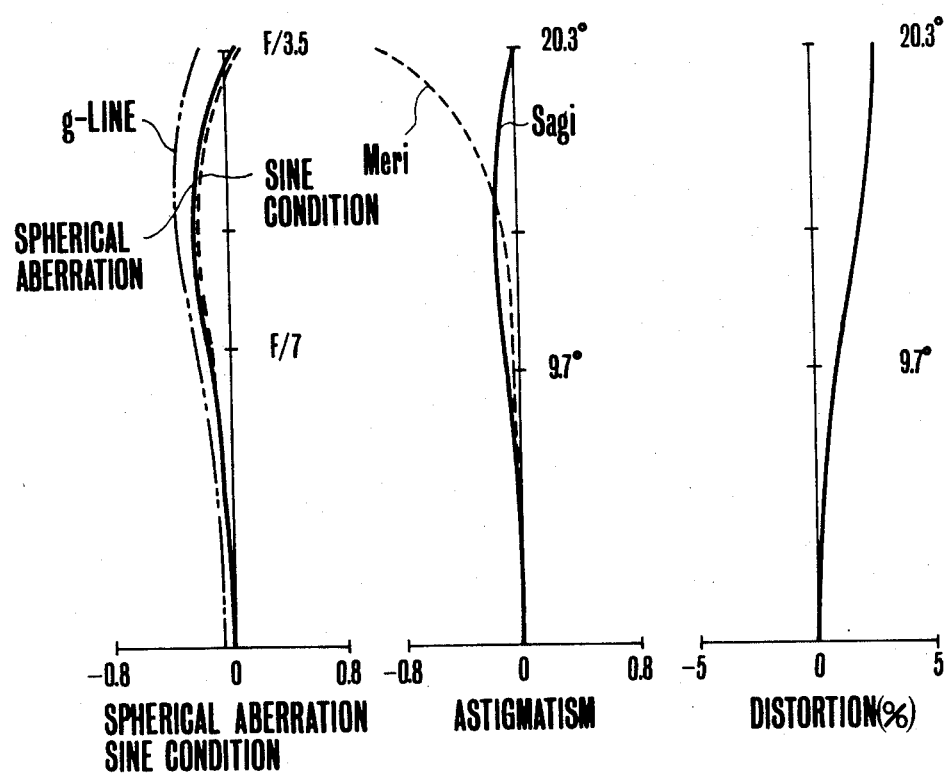

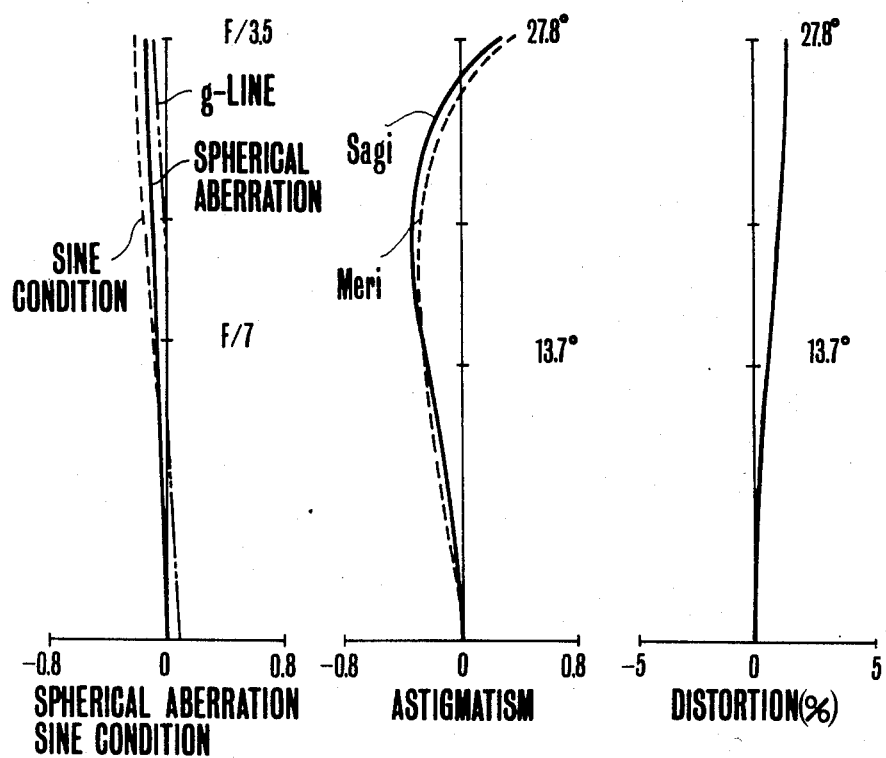

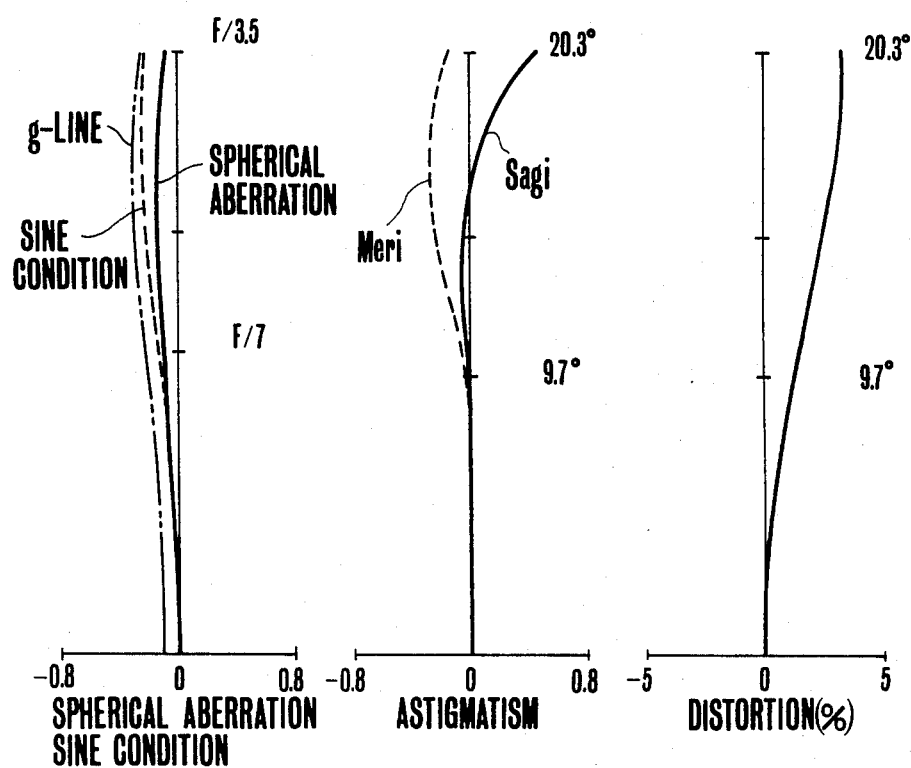

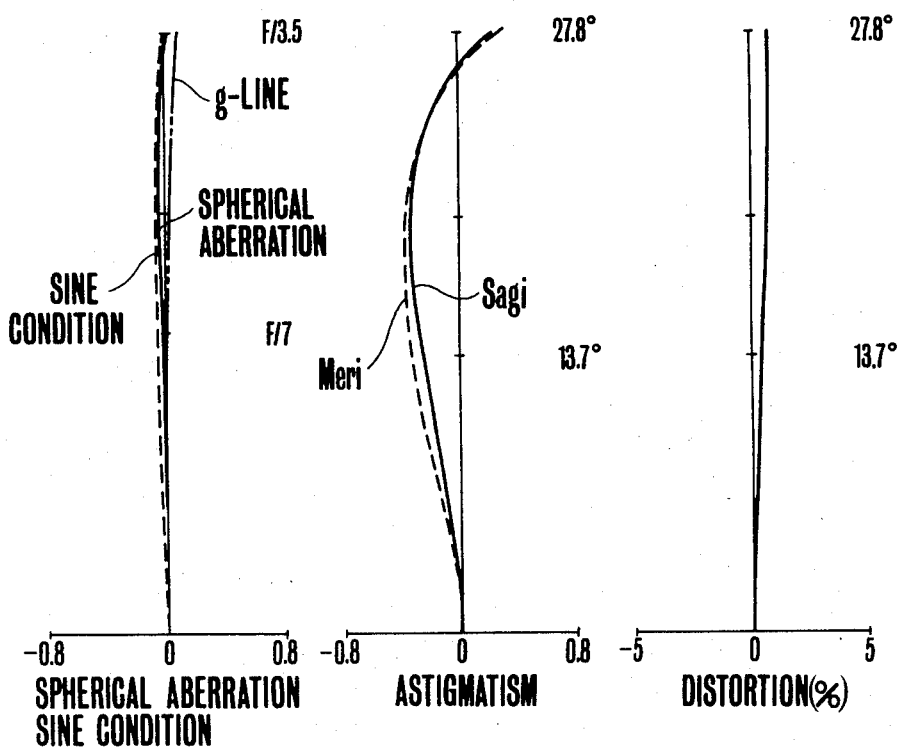

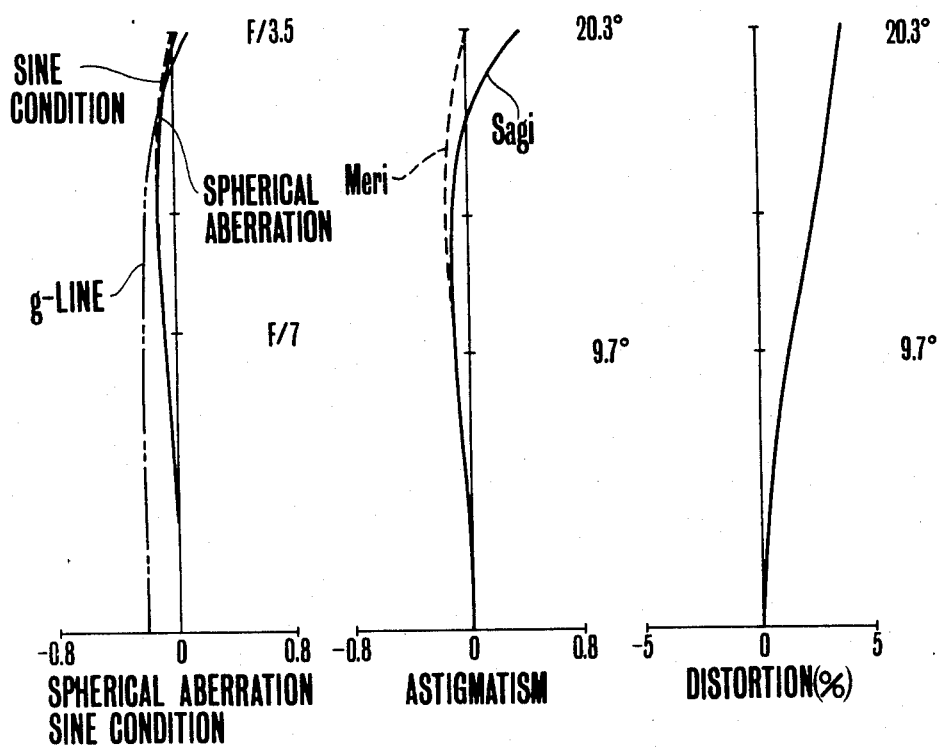
FIG.6B1  FIG.6B2  FIG.6B3

FIG.8A1 FIG.8A2 FIG.8A3
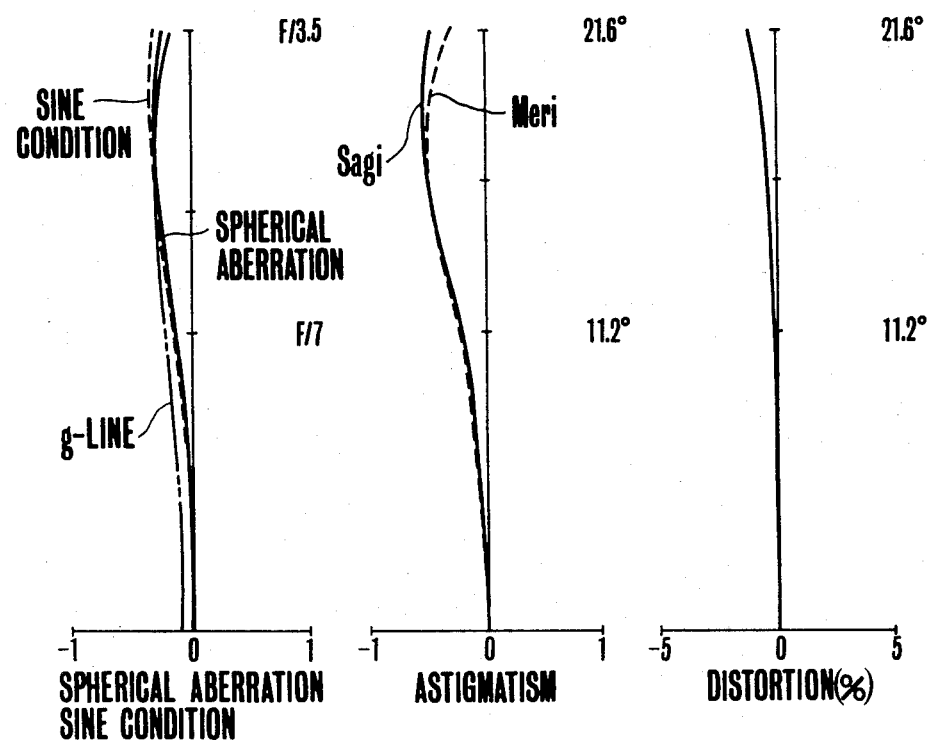

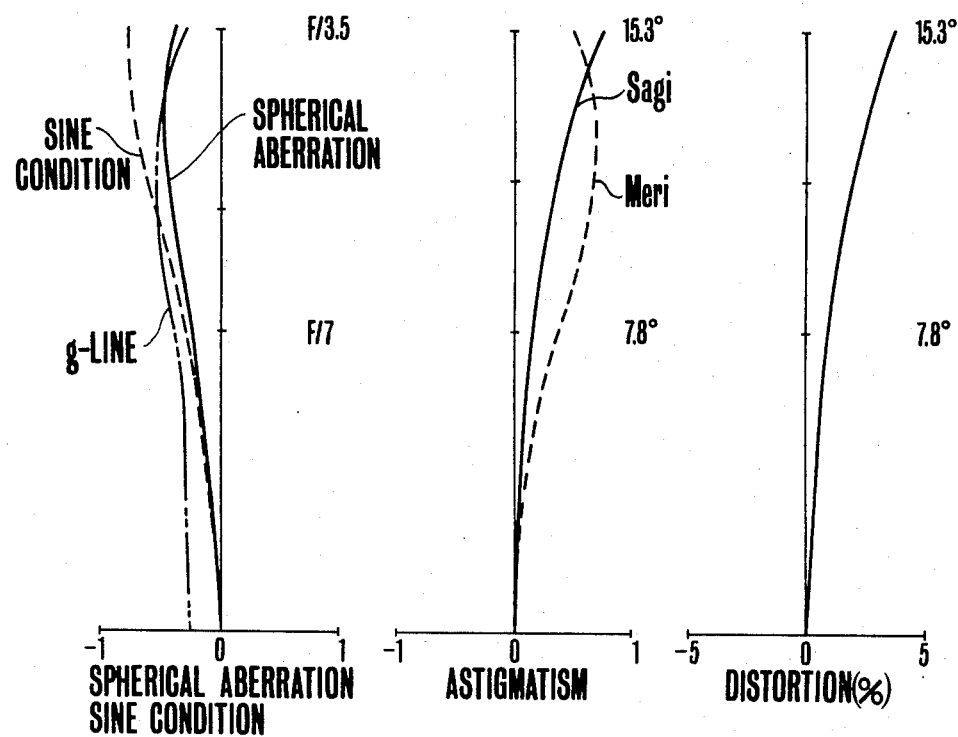
FIG.8B1　　FIG.8B2　　FIG.8B3

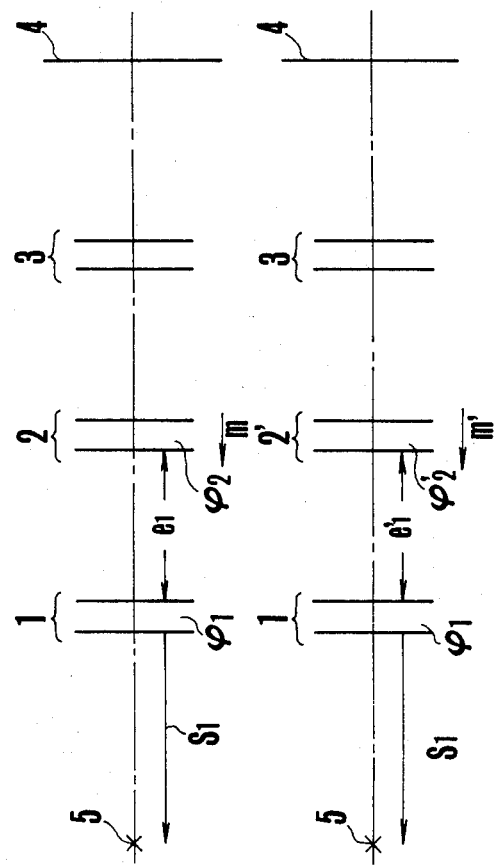

FIG.11A1  FIG.11A2  FIG.11A3
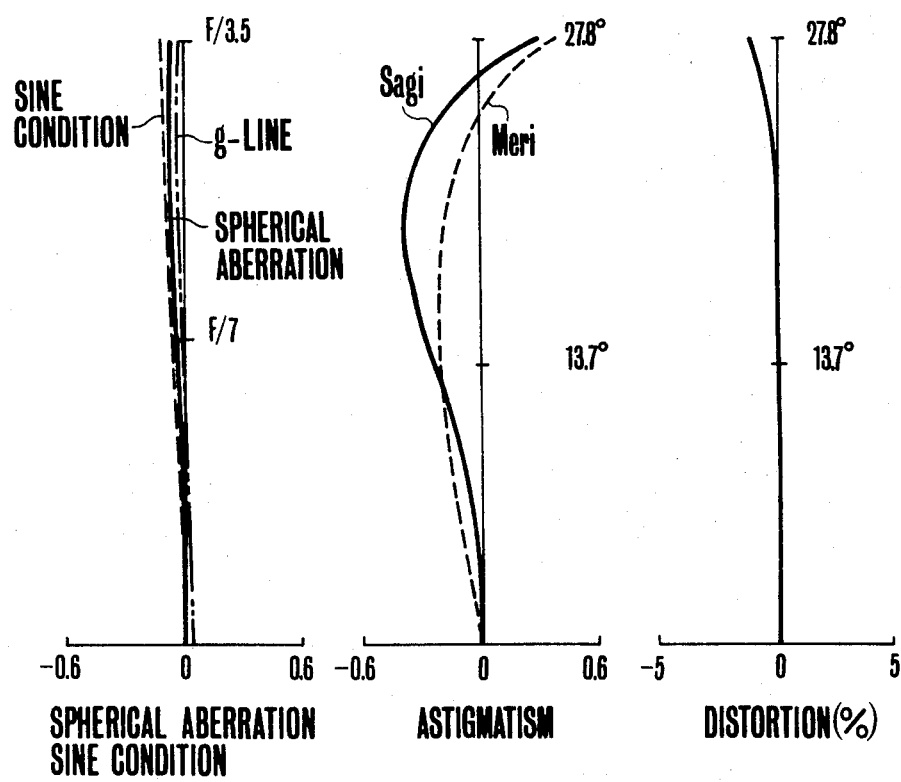

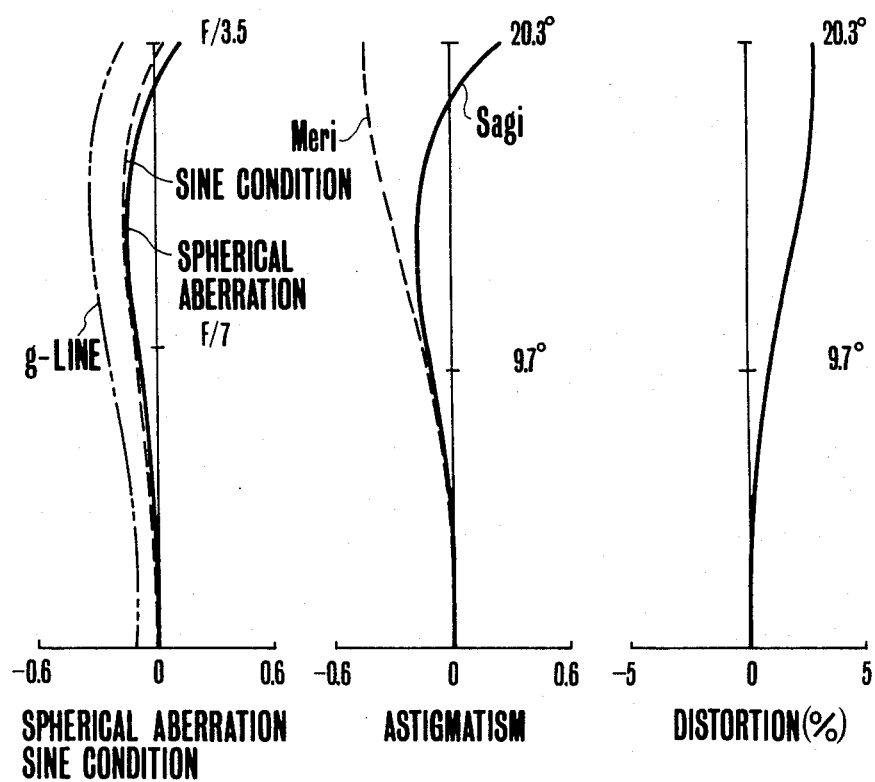

VARIABLE MAGNIFICATION LENS SYSTEM

BACKGROUND OF THE INVENTION

1. Field of the Invention

This invention relates to variable magnification lens systems and more particularly to the discrete variation of the focal length of a lens system.

2. Description of the Prior Art

Recently, the lens systems usable with the outside finder-equipped 35 m/m cameras have become very compact. However, these lens systems are generally of single focal lengths, or are single lenses. At present, there are a few variable focus or zoom lens systems. But, these zoom lens systems lack compactness, taking so large a bulk and size as to be equal to that of an equivalent lens used in the TTL type single lens reflex cameras. Compactness of the zoom lens systems for use in the outside finder 35 m/m cameras is very difficult to achieve, as far as the zooming method which is generally accepted in the prior art is concerned.

In the art of 35 m/m cameras, it has been proposed to employ a method of discretely varying the focal length as the zooming method, with an advantage that a compactness of the lens system can be facilitated. In U.S. Pat. No. 3,388,650, there is disclosed a method of varying the magnification by inserting a supplementary lens system into a space between the master lens system and the image plane, and by shifting the master lens as a whole.

SUMMARY OF THE INVENTION

An object of the present invention is to provide a lens system capable of obtaining different focal lengths at two or more discrete points by a new zooming method unlike the conventional zooming method.

Another object of the present invention is to provide a lens system of compact lens construction while still permitting an excellent effect of magnification variation and a good state of correction of aberrations.

To accomplish the above-described objects it is in the lens system according to the present invention that the principal lens system is divided into a plurality of lens components, one of which is made replaceable by a new lens component of different refractive power from that of the old one and at least one of the others of which has to be axially moved to a certain position as this replacement is carried out.

In a general embodiment of lens systems according to the present invention, there are a first lens component, counting from front, of positive refractive power, a second lens component of negative refractive power, and a third lens component of positive refractive power. In this successive arrangement, upon interchange of the above-described second lens component with one of different refractive power from that of the removed second lens component, and upon concurrent axial movement of the above-described first lens component, the magnification is varied while maintaining the constant position of the image plane. Because of the lens construction having such power distribution as positive, negative and positive, the outer diameter of the interchangeable second lens system is in general advantageously reduced, thereby it is being made possible to set the entire lens system in a very compact form.

BRIEF EXPLANATION OF THE DRAWINGS

FIGS. 2(A1)–(A3) are graphic representations of the various aberrations of the lens system of FIG. 1(A).

FIGS. 2(B1)–(B3) are graphic representations of the various aberrations of the lens system of FIG. 1(B).

FIGS. 4(A1)–(A3) are graphic representations of the various aberrations of the lens system of FIG. 4(A).

FIGS. 4(B1)–(B3) are graphic representations of the various aberrations of the lens system of FIG. 4(B).

FIGS. 6(A1)–(A3) are graphic representations of the various aberrations of the lens system of FIG. 5(A).

FIGS. 6(B1)–(B3) are graphic representations of the various aberrations of the lens system of FIG. 5(B).

FIGS. 8(A1)–(A3) are graphic representations of the various aberrations of the lens system of FIG. 7(A).

FIGS. 8(B1)–(B3) are graphic representations of the various aberrations of the lens system of FIG. 7(B).

FIG. 9 is a thin lens system according to the present invention.

FIGS. 11(A1)–(A3) are graphic representations of the various aberrations of the lens system of FIG. 10(A).

FIGS. 11(B1)–(B3) are graphic representations of the various aberrations of the lens system of FIG. 10(B).

DETAILED DESCRIPTION OF THE PREFERRED EMBODIMENTS

Figure 1A:
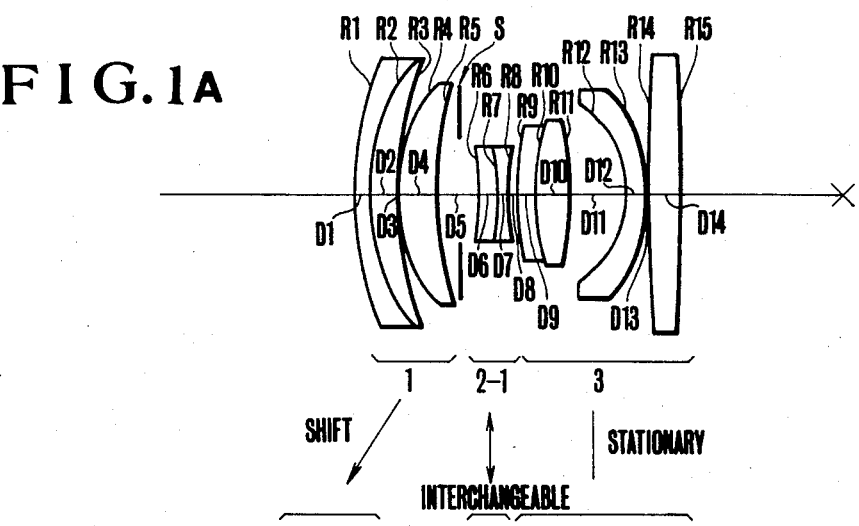
FIGS. 1(A) and 1(B) are lens block diagrams of a first embodiment of a lens system according to the present invention in shorter and longer focal length positions respectively.
Figure 1B:
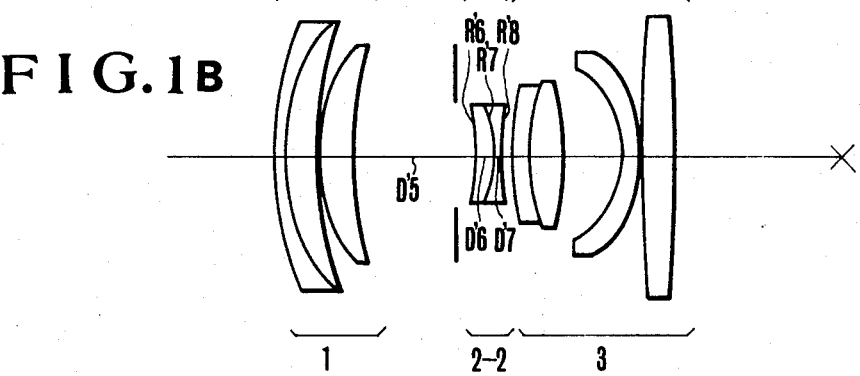

Referring to FIGS. 1(A) and 1(B), let us now designate the first lens component of positive refractive power counting from the front, the second lens component of negative refractive power and the third lens component of positive refractive power with their powers (reciprocal number of the focal length) by $\psi_1$, $\psi_2$ and $\psi_3$ respectively, the interval between the principal points of the first and second lens groups by $e_1$, and the interval between the principal points of the second and third lens components by $e_2$. After the interchange, the resultant power of the second lens component is designated by $\psi_2'$, and the resultant intervals by $e_1'$ and $e_2'$ respectively. Now, for simplicity, we set forth $e_2 = e_2'$.

Then, in order that before and after the interchange of the second lens component, the image plane remains unchanged in position, it is required to determine the $\psi_2'$ as satisfying the following equation:

$$\psi_2' = \psi_1 \left[ \frac{1}{1 - e_1\psi_1} - \frac{1}{1 - e_1'\psi_1} \right] + \psi_2$$

By this interchange, it is of course resultant that the focal length of the entire system takes a different value.

If $e_1 < e_1'$, the $|\psi_2| < |\psi_2'|$. After the interchange, therefore, the focal length of the entire system is increased. That is, when the first lens component is axially moved forwards, and the second lens component is interchanged with the new one of larger power in negative sense, the entire lens system changes its focal length from the shorter to the longer value. In this case, the total length of the lens is shorter when in the short focal length setting than when in the long focal length setting, giving great advantages that a large advance toward the compactness of the lens system can be achieved particularly with the shortening of the diameter of the front lens component, and that the aberrational problem can be easily handled.

Next, if an aperture stop is positioned just in front, or in rear, of the interchangeable lens component, as the effective outer diameter of the interchangeable lens component depends almost on the F-number light bundle only, this lens component can be reduced in the outer diameter, so that the space which the interchangeable lens occupies in the camera housing may be of small dimensions. This is advantageous to the construction of the camera body in compact form. Further, since the position of the aperture stop can be unchanged by the lens interchange, and since the diameter of the full open aperture can be substantially the same, it is made possible that the diaphragm mechanism, or the shutter mechanism (which also serves as the diaphragm) can be simplified in structure and minimized in the bulk and size thereof.

Next, as the focal length is varied, the rays of light incident upon the positive first lens component change their positions to a considerable extent. It is, therefore, necessary to correct this lens group itself for the aberrations to some extent. Thus, the requirement is to construct it with at least positive and negative members. Also, the positive third lens component, because of its attributing to a shortening of the back focus for the compactness of the lens system, is preferably constructed with a combination of positive and negative lens members in this order from the front.

Here, to facilitate a minimization of the bulk and size of the entire lens system, it is required to limit the length L from the front vertex to the image plane in the short focal length position to a value larger than one time and smaller than 1.7 times the short focal length. In examples of specific lens systems of the invention, the L is found to range from 1.17 to 1.23 times the shorter focal length. Thus, the lens system in question may be said to be very compact. When L=1.0 is decreased, though the lens system can be made more compact, aberration correction in the shorter focal length position is made more difficult to perform, and a high grade imaging performance is no longer assured. When L=1.7 is exceeded, though advantageous to the aberration correction, the bulk and size of the lens system becomes objectionably large.

FIG. 9 represents the first positive lens component 1, the second negative lens component 2, the second negative lens component 2' after the interchange, the third positive lens component 3, the image forming plane 4, and the object 5. The first lens component 1 and the second lens component 2 or 2' constitute an afocal optical system.

The powers of the first and second lens components (reciprocal number of the focal length) are designated by $\psi_1$ and $\psi_2$ respectively, the interval between their principal points by $e_1$. After the interchange, the resultant power of another lens component is designated by $\psi_2'$, and the resultant interval by $e_1'$. The distance from the principal point of the front side of the first lens component to the object is $S_1$, and the shifting amounts of the second lens component corresponding to the same distance $S_1$ are m and m' respectively.

Now the following equations (1) and (2) are adduced from the condition that the first and second lens components as a whole constitute an afocal system.

$$m = \frac{1}{\psi_2} - e_1 + \frac{1}{1/(-S_1) + \psi_1} \quad (1)$$

$$m' = \frac{1}{\psi_2'} - e_1' + \frac{1}{1/(-S_1 + e_1' - e_1) + \psi_1} \quad (2)$$

Also, the equation (3) is adduced from the next relations:

$$\psi_1 + \psi_2 - e_1\psi_1\psi_2 = 0, \quad (3)$$

$$\psi_1 + \psi_2' - e_1'\psi_1\psi_2' = 0$$

$$\frac{1}{\psi_1} = e_1 - \frac{1}{\psi_2} = e_1' - \frac{1}{\psi_2'}$$

It is generally established that $$S_1 \gg e_1' - e_1$$

and when we introduce the equation (3) into the equations (1) and (2), $m \doteq m'$.

Regarding the fifth embodiment, relations in the paraxial region are set forth in Table 1.

TABLE 1

| | | | |
|---|---|---|---|
| $\psi_1 = 0.027027$ | $e = 10$ | $\psi_1 = 0.027027$ | $e_1' = 18.0769$ |
| $\psi_2 = -0.037037$ | | $\psi_2' = -0.0528455$ | |
| $\psi_3 = 0.033424$ | | $\psi_3 = 0.033424$ | |
| $f = 41$ | | $f = 58.5$ | |

In the power arrangement shown in Table 1, the shifting amount for changing the object distance from the indefinite distance to 1 m (distance from the object to the image plane) by focusing of the second lens component is 1.502 mm toward the image plane on the shorter focal length side and 1.515 mm toward the image plane on the longer focal length side. The difference is only 0.0013 mm and the amounts may be considered to be substantially equal.

Therefore, if the second lens components (2 and 2') which are interchanged at the shorter length side point and the longer focal length side are incorporated into the turret, it is no more necessary to provide separate shifting mechanisms each at the shorter focal length side and the longer focal length side, and it is necessary only to shift the whole turret. Thereby, the shifting structure can be simplified and made compact.

Figure 10A:
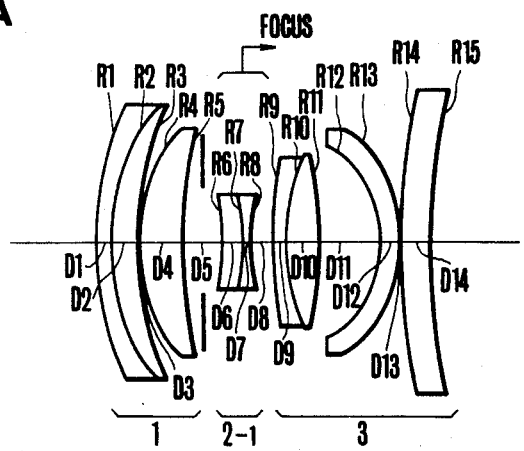
FIG. 10(A) is a cross sectional view of the lens of a fifth embodiment in shorter focal length position.
Figure 10B:
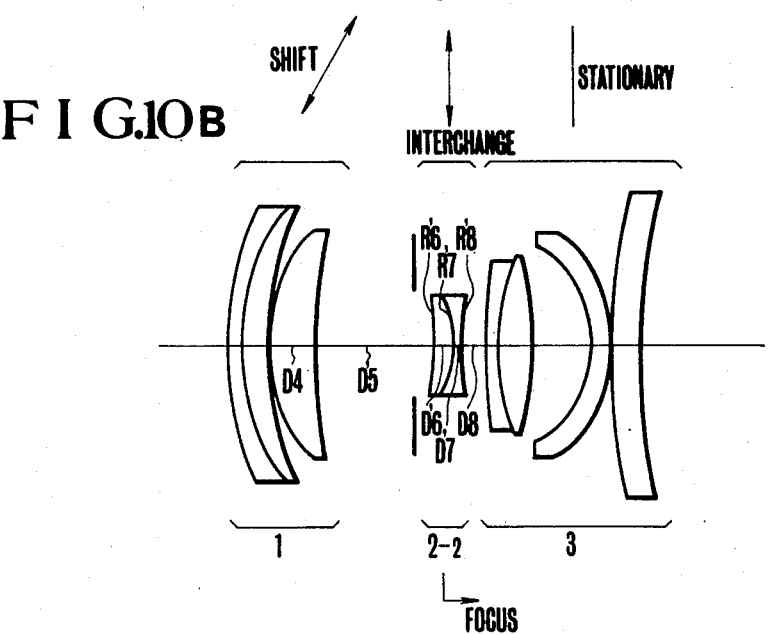
FIG. 10(B) is a cross sectional view of the same lens in longer focal length position.

The lens data of the fifth embodiment will be described hereinbelow. The cross sectional views of the lens system corresponding to the lens data are shown in FIGS. 10(A) and 10(B); FIG. 10(A) showing the cross sectional view at the shorter length while FIG. 10(B) shows the same at the longer focal length. In this lens system, the second lens component 2-1 at the shorter focal length is replaced by the second lens component 2-2 having a different power, and at the same time, the first lens component is moved toward the object side, so as to provide a longer focal length of the lens system. At this point, the third lens component is retained fixed. For focusing the second lens components (2-1, 2-2) are moved along the optical axis. Meanwhile, if a focusing mechanism provided such that the shifting amount for the longer focal length is different from the shorter focal length, the above condition for the afocal optical system may be omitted.

In the first to third embodiments of the invention to be described later, the lens system may be chosen with a shorter focal length of f=41, with an image angle of $2\omega=55.6°$ and a longer focal length of f=58.5 with an image angle of $2\omega=40.6°$, while the F-number is maintained at 3.5. In the fourth embodiment, there is shown a variable focus lens system having a shorter focal length f=40.4 with an image angle $2\omega=43.2°$ and a longer focal length f=58.6 with an image angle $2\omega=30.6°$, and having an F-number of 3.5. Also in the various embodiments, Ri denotes the radius of curvature of the i-th lens surface, Di the axial thickness or axial air separation between the i-th and (i+1)th lens surface, N the indices of refraction of the glasses from which the lens elements are made up, and $\nu d$ the Abbe numbers of the glasses. Further, the L(W) is obtained by dividing the distance from the first lens surface $R_1$ counting from the front to the image plane in the shorter focal length position by the focal length of the entire system when set in the shorter focal length.

Figure 3A:
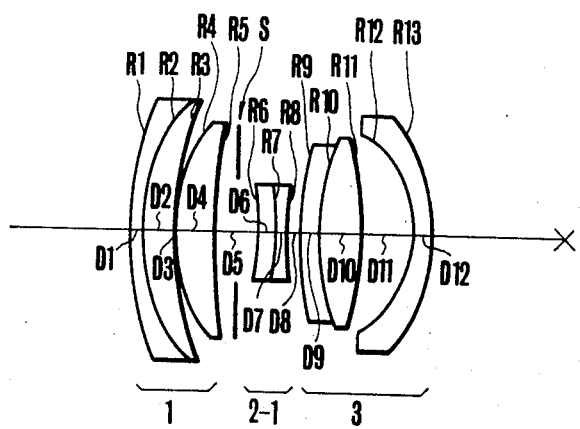
FIGS. 3(A) and 3(B) are lens block diagrams of a second embodiment of another lens system according to the present invention in shorter and longer focal length positions respectively.
Figure 3B:
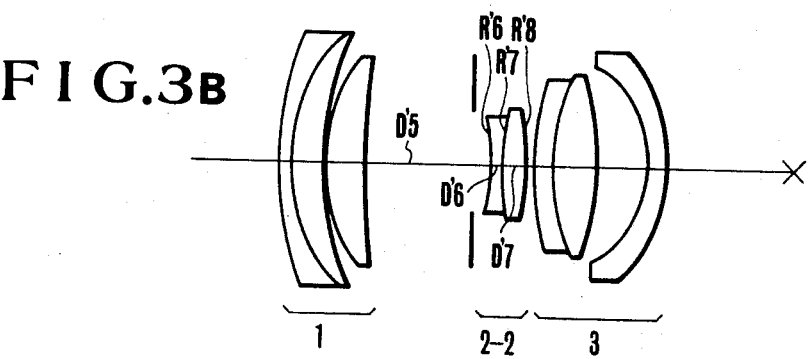
Figure 5A:
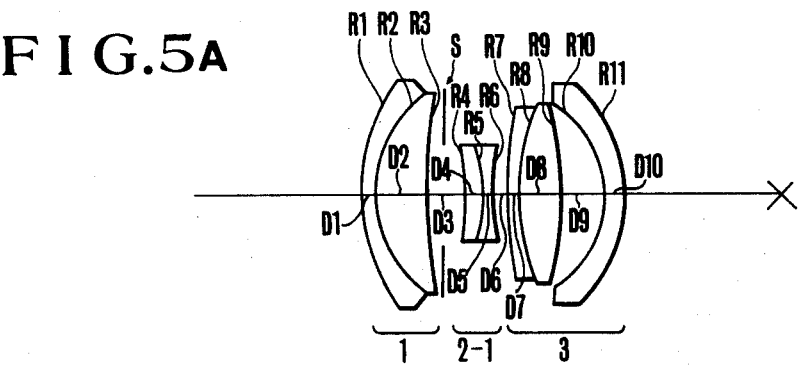
FIGS. 5(A) and 5(B) are lens block diagrams of a third embodiment of another lens system according to the present invention in shorter and longer focal length positions respectively.
Figure 5B:
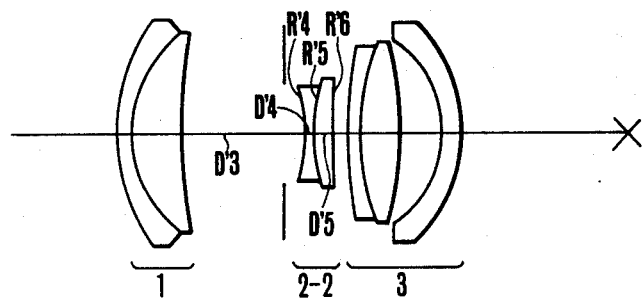
Figure 7A:
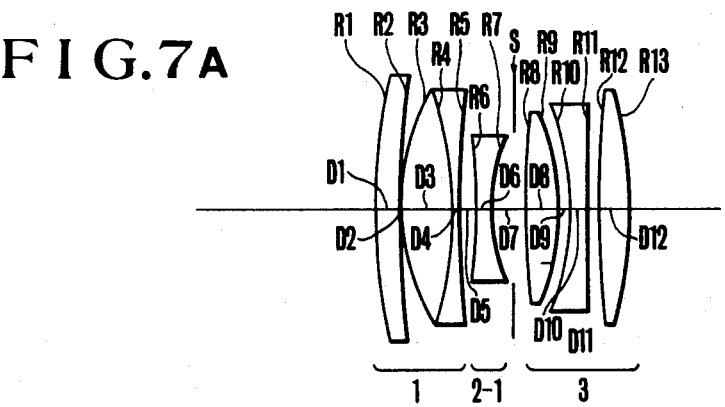
FIGS. 7(A) and 7(B) are lens block diagrams of a fourth embodiment of another lens system according to the present invention in shorter and longer focal length positions respectively.
Figure 7B:
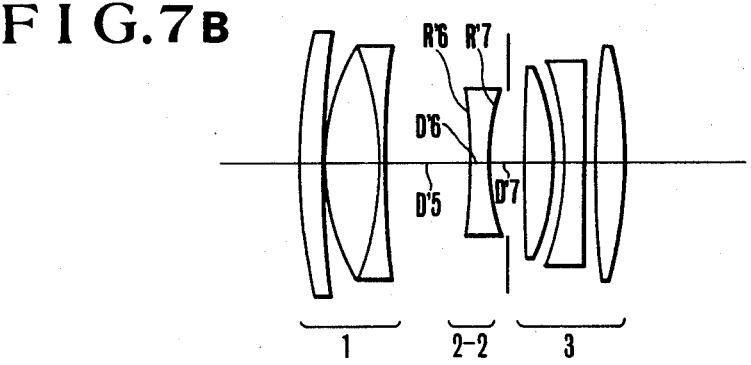

The first embodiment of the lens system is shown in FIG. 1 with its various aberrations (spherical aberration, sine condition, astigmatism and distortion) in FIG. 2. The second embodiment of the lens system is shown in FIG. 3 with its various aberrations in FIG. 4. The third embodiment of the lens system is shown in FIG. 5 with its various aberrations in FIG. 6. The fourth embodiment of the lens system is shown in FIG. 7 with its various aberrations in FIG. 8. It is noted in connection with the various drawings from FIG. 1 to FIG. 8 that (A) corresponds to the shorter focal length position and (B) to the longer focal length position.

The operation of the lens system in the first to fifth embodiments is the same and is therefore explained in connection with the first embodiment only. The lens system comprises, as shown in FIGS. 1(A) and 1(B), a first lens component 1 having a positive refractive power, a second lens component 2-1 or 2-2 having a negative refractive power and a third lens component 3 having a positive refractive power. As FIG. 1(A) shows the lens system in the shorter focal length position, when the focal length of the lens system is to be varied to the longer one shown in FIG. 1(B), the negative second lens component 2-1 is replaced by the other lens component 2-2 having a different refractive power to that of the preceding one 2-1, and then the first lens component 1 is shifted toward the front. During this time, the third lens component remains stationary. It is noted in the drawings that S denotes a diaphragm. In the following there are given the lens data of the first to fifth embodiments of the invention.

First Embodiment
Focal Length f = 41–58.5 F-number: F/3.5
Image Angle $2\omega = 55.6°-40.6°$

| | Radius of Curvature | Thickness & Separation | | Refractive Index (Nd) | | Abbe Number ($\nu d$) |
|---|---|---|---|---|---|---|
| | $R_1$ 30.446 | $D_1$ | 1.3 | $N_1$ 1.80518 | $\nu_1$ | 25.4 |
| | $R_2$ 19.238 | $D_2$ | 2.97 | $N_2$ 1.60311 | $\nu_2$ | 60.7 |
| | $R_3$ 33.002 | $D_3$ | 0.15 | | | |
| | $R_4$ 15.577 | $D_4$ | 3.85 | $N_3$ 1.6968 | $\nu_3$ | 55.5 |
| | $R_5$ 41.822 | $D_5$ | 4.14 | | | |
| | $R_6$ −27.059 | $D_6$ | 2. | $N_4$ 1.7725 | $\nu_4$ | 49.6 |
| 2-1 | $R_7$ −15.347 | $D_7$ | 0.8 | $N_5$ 1.5231 | $\nu_5$ | 50.8 |
| | $R_8$ 21.502 | $D_5'$ | 11.68 | | | |
| | $R_6'$ −38.856 | $D_6'$ | 2. | $N_4'$ 1.54869 | $\nu_4'$ | 45.6 |
| 2-2 | $R_7'$ −9.395 | $D_7'$ | 0.8 | $N_5'$ 1.6968 | $\nu_5'$ | 55.5 |
| | $R_8'$ 31.732 | $D_8$ | 1. | | | |
| | $R_9$ 38.382 | $D_9$ | 1.3 | $N_6$ 1.5927 | $\nu_6$ | 35.3 |
| | $R_{10}$ 15.718 | $D_{10}$ | 3.29 | $N_7$ 1.7725 | $\nu_7$ | 49.6 |
| | $R_{11}$ −51.995 | $D_{11}$ | 6.25 | | | |
| | $R_{12}$ −9.8177 | $D_{12}$ | 1.7 | $N_8$ 1.59551 | $\nu_8$ | 39.2 |
| | $R_{13}$ −13.56 | $D_{13}$ | 0.15 | | | |
| | $R_{14}$ 178.137 | $D_{14}$ | 3. | $N_9$ 1.6968 | $\nu_9$ | 55.5 |
| | $R_{15}$ −289.663 | | | | | |

L(W) = 1.23

Second Embodiment
Focal Length f = 41–58.8 F-number: F/3.5
Image Angle $2\omega = 40.6°-55.6°$

| | Radius of Curvature | Thickness & Separation | | Refractive Index (Nd) | | Abbe Number ($\nu d$) |
|---|---|---|---|---|---|---|
| | $R_1$ 31.844 | $D_1$ | 1.3 | $N_1$ 1.7552 | $\nu_1$ | 27.5 |
| | $R_2$ 17.028 | $D_2$ | 3.23 | $N_2$ 1.65844 | $\nu_2$ | 50.9 |
| | $R_3$ 32.014 | $D_3$ | 0.15 | | | |
| | $R_4$ 16.047 | $D_4$ | 3.56 | $N_3$ 1.6968 | $\nu_3$ | 55.5 |
| | $R_5$ 47.164 | $D_5$ | 4.42 | | | |
| | $R_6$ −26.976 | $D_6$ | 2. | $N_4$ 1.7725 | $\nu_4$ | 49.6 |
| 2-1 | $R_7$ −17.626 | $D_7$ | 0.8 | $N_5$ 1.53172 | $\nu_5$ | 48.9 |
| | $R_8$ 24.572 | $D_5'$ | 12.85 | | | |
| | $R_6'$ −17.428 | $D_6'$ | 0.8 | $N_4'$ 1.6968 | $\nu_4'$ | 55.5 |
| 2-2 | $R_7'$ 16.116 | $D_7'$ | 2. | $N_5'$ 1.54869 | $\nu_5'$ | 45.6 |
| | $R_8'$ 169.741 | $D_8$ | 1.5 | | | |
| | $R_9$ 45.368 | $D_9$ | 1.3 | $N_6$ 1.5927 | $\nu_6$ | 35.3 |
| | $R_{10}$ 17.917 | $D_{10}$ | 4.59 | $N_7$ 1.7725 | $\nu_7$ | 49.6 |
| | $R_{11}$ −32.833 | $D_{11}$ | 5.49 | | | |
| | $R_{12}$ −11.1997 | $D_{12}$ | 1.7 | $N_8$ 1.51742 | $\nu_8$ | 52.3 |

Second Embodiment (continued)
Focal Length f = 41–58.8 F-number: F/3.5
Image Angle 2ω = 40.6°–55.6°

| Radius of Curvature | | Thickness & Separation | | Refractive Index (Nd) | Abbe Number (νd) |
|---|---|---|---|---|---|
| $R_{13}$ | −17.186 | | | | |

L(W) = 1.22

Third Embodiment
Focal Length f = 41–58.5 F-number: F/3.5
Image Angle 2ω = 40.6–55.6°

| | Radius of Curvature | | Thickness & Separation | | Refractive Index (Nd) | | Abbe Number (νd) |
|---|---|---|---|---|---|---|---|
| | $R_1$ | 16.985 | $D_1$ | 1.3 | $N_1$ 1.7552 | $\nu_1$ | 27.5 |
| | $R_2$ | 11.422 | $D_2$ | 5.14 | $N_2$ 1.6968 | $\nu_2$ | 55.5 |
| | $R_3$ | 47.278 | $D_3$ | 3.86 | | | |
| | $R_4$ | −25.038 | $D_4$ | 2. | $N_3$ 1.7725 | $\nu_3$ | 49.6 |
| 2-1 | $R_5$ | −14.204 | $D_5$ | 0.8 | $N_4$ 1.53172 | $\nu_4$ | 48.9 |
| | $R_6$ | 23.346 | $D_3'$ | 12.11 | | | |
| | $R_4'$ | −20.41 | $D_4'$ | 0.8 | $N_3'$ 1.6968 | $\nu_3'$ | 55.5 |
| 2-2 | $R_5'$ | 13.028 | $D_5'$ | 2. | $N_4'$ 1.54869 | $\nu_4'$ | 45.6 |
| | $R_6'$ | 82.472 | $D_6$ | 1.5 | | | |
| | $R_7$ | 41.641 | $D_7$ | 1.3 | $N_5$ 1.5927 | $\nu_5$ | 35.3 |
| | $R_8$ | 22.44 | $D_8$ | 3.88 | $N_6$ 1.7725 | $\nu_6$ | 49.6 |
| | $R_9$ | −34.586 | $D_9$ | 4.28 | | | |
| | $R_{10}$ | −11.246 | $D_{10}$ | 1.7 | $N_7$ 1.51742 | $\nu_7$ | 52.3 |
| | $R_{11}$ | −15.42 | | | | | |

L(W) = 1.17

Fourth Embodiment
Focal Length f = 40.4–58.6 F-number: F/3.5
Image Angle 2ω = 30.6°–43.2°

| | Radius of Curvature | | Thickness & Separation | | Refractive Index (Nd) | | Abbe Number (νd) |
|---|---|---|---|---|---|---|---|
| | $R_1$ | 32.45 | $D_1$ | 2.07 | $N_1$ 1.64 | $\nu_1$ | 60.1 |
| | $R_2$ | 72.966 | $D_2$ | 0.15 | | | |
| | $R_3$ | 15.079 | $D_3$ | 3.75 | $N_2$ 1.58913 | $\nu_2$ | 61.1 |
| | $R_4$ | −33.069 | $D_4$ | 0.7 | $N_3$ 1.58144 | $\nu_3$ | 40.7 |
| | $R_5$ | 74.287 | $D_5$ | 1.32 | | | |
| 2-1 | $R_6$ | −36.541 | $D_6$ | 1.2 | $N_4$ 1.60562 | $\nu_4$ | 43.7 |
| | $R_7$ | 12.022 | $D_7$ | 2.87 | | | |
| 2-2 | $R_6'$ | −38.27 | $D_5'$ | 6.87 | $N_4'$ 1.883 | $\nu_4'$ | 40.8 |
| | $R_7'$ | 12.791 | $D_6'$ | 1.2 | | | |
| | $R_8$ | 81.563 | $D_7'$ | 2.9 | $N_5$ 1.6779 | $\nu_5$ | 55.3 |
| | $R_9$ | −16.465 | $D_8$ | 2.4 | | | |
| | $R_{10}$ | −17.771 | $D_9$ | 1. | $N_6$ 1.49171 | $\nu_6$ | 57.4 |

Fourth Embodiment (continued)
Focal Length f = 40.4–58.6 F-number: F/3.5
Image Angle 2ω = 30.6°–43.2°

| Radius of Curvature | | Thickness & Separation | | Refractive Index (Nd) | Abbe Number (νd) |
|---|---|---|---|---|---|
| $R_{11}$ | 243.486 | $D_{10}$ | 1.2 | | |
| $R_{12}$ | 68.499 | $D_{11}$ | 1. | $N_7$ 1.57135 $\nu_7$ | 52.9 |
| $R_{13}$ | −39.496 | $D_{12}$ | 2. | | |

L(W) = 1.19

Fifth Embodiment
Focal Length f = 41–58.5 F-number: F/3.5
Image Angle 2ω = 40.6°–55.6°

| | Radius of Curvature | | Thickness & Separation | | Refractive Index (Nd) | | Abbe Number (νd) |
|---|---|---|---|---|---|---|---|
| | $R_1$ | 31.046 | $D_1$ | 1.3 | $N_1$ 1.80518 | $\nu_1$ | 25.4 |
| | $R_2$ | 19.417 | $D_2$ | 2.886 | $N_2$ 1.60311 | $\nu_2$ | 60.7 |
| | $R_3$ | 32.107 | $D_3$ | 0.15 | | | |
| | $R_4$ | 15.894 | $D_4$ | 4.313 | $N_3$ 1.6968 | $\nu_3$ | 55.5 |
| | $R_5$ | 47.193 | $D_5$ | 3.845 | | | |
| | $R_6$ | −32.735 | $D_6$ | 2. | $N_4$ 1.7725 | $\nu_4$ | 49.6 |
| 2-1 | $R_7$ | −27.522 | $D_7$ | 0.8 | $N_5$ 1.5231 | $\nu_5$ | 50.8 |
| | $R_8$ | 23.787 | $D_5'$ | 11.661 | | | |
| | $R_6'$ | −29.531 | $D_6'$ | 2. | $N_4'$ 1.54869 | $\nu_4'$ | 45.6 |
| 2-2 | $R_7'$ | −9.021 | $D_7'$ | 0.8 | $N_5'$ 1.6968 | $\nu_5'$ | 55.5 |
| | $R_8'$ | 41.549 | $D_8$ | 2.2 | | | |
| | $R_9$ | 45.049 | $D_9$ | 1.3 | $N_6$ 1.5927 | $\nu_6$ | 35.3 |
| | $R_{10}$ | 20.708 | $D_{10}$ | 2.993 | $N_7$ 1.7725 | $\nu_7$ | 49.6 |
| | $R_{11}$ | −38.312 | $D_{11}$ | 6.398 | | | |
| | $R_{12}$ | −10.567 | $D_{12}$ | 1.7 | $N_8$ 1.59551 | $\nu_8$ | 39.2 |
| | $R_{13}$ | −13.554 | $D_{13}$ | 0.15 | | | |
| | $R_{14}$ | 62.783 | $D_{14}$ | 3. | $N_9$ 1.6968 | $\nu_9$ | 55.5 |
| | $R_{15}$ | 66.311 | | | | | |

What is claimed is:

1. An interchange type variable magnification objective lens system having an optical axis and in which a lens component is made interchangeable to effect a variation of the focal length, consisting of, from the front to the rear of the lens system in the direction of the optical axis:

a first lens component having a positive refractive power and arranged to be axially movable;

a second lens component having a negative refractive power; and a third lens component having a positive refractive power;

said lens components being arranged so that when said first lens component is moved along the optical axis, and at the same time said second lens component is replaced by a fourth lens component having a different negative refractive power to that of said second lens component, the focal length of the lens system is varied.

2. An interchange type variable magnification objective lens system according to claim 1, further including an aperture stop positioned forwardly adjacent or rearwardly adjacent said second lens component.

3. An interchange type variable magnification objective lens system according to claim 2, wherein the distance from the first surface counting from the front of the lens system to the image plane, when in the shorter focal length position, is smaller than 1.7 times the shorter focal length.

4. An interchange type variable magnification objective lens system according to claim 3, wherein said second and said fourth lens components have a first surface, counting from the front, of concave curvature toward the front.

5. An interchange type variable magnification objective lens system according to claim 4, wherein said first lens component has a meniscus lens of forward convexity.

6. An interchange type variable magnification objective lens system according to claim 1, in which the second lens component is movable along the optical axis for focusing.

7. An interchange type variable magnification objective lens system according to claim 1, in which the first lens component and the second lens component constitute a substantial afocal optical system with respect to an infinitely distant object.

8. An interchange type variable magnification lens system according to claim 3, wherein when the second lens component is in attachment or when the fourth lens component is in attachment, the respective lens component is made to move rearwardly along the optical axis as focusing is performed from an infinitely distant object to a close object point.

* * * * *